No. 789,821. PATENTED MAY 16, 1905.
F. B. STOUT.
DRAFT EQUALIZER.
APPLICATION FILED AUG. 12, 1904.
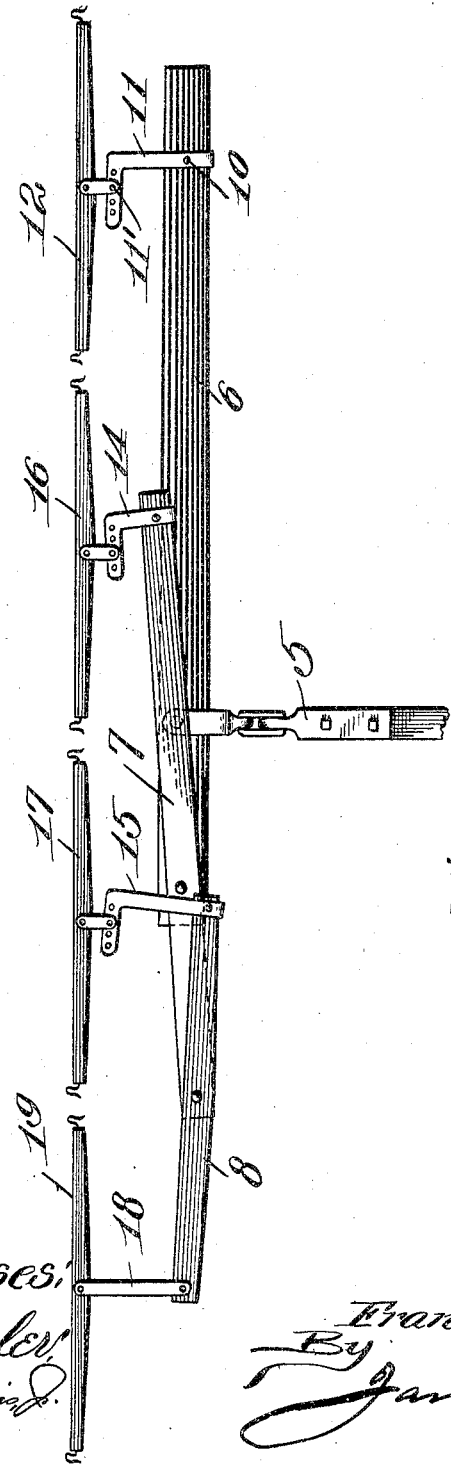
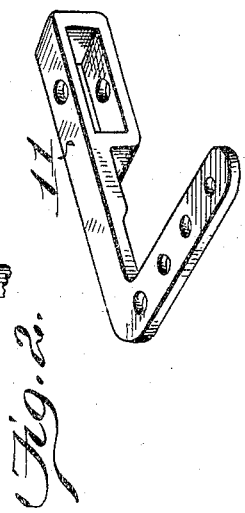
Witnesses:
C. L. Kesler
James L. Norris
Inventor
Franklin B. Stout
By James L. Norris.
Atty.

No. 789,821. Patented May 16, 1905.

UNITED STATES PATENT OFFICE.

FRANKLIN B. STOUT, OF BALTIC, SOUTH DAKOTA.

DRAFT-EQUALIZER.

SPECIFICATION forming part of Letters Patent No. 789,821, dated May 16, 1905.

Application filed August 12, 1904. Serial No. 220,545.

*To all whom it may concern:*

Be it known that I, FRANKLIN B. STOUT, a citizen of the United States, residing at Baltic, in the county of Minnehaha and State of South Dakota, have invented new and useful Improvements in Draft-Equalizers, of which the following is a specification.

This invention relates to draft-equalizers; and the primary object of the invention is in a ready, thoroughly feasible, and practicable manner to secure the hitching of four horses to a sulky-plow in such a manner that each horse is forced to pull his share and that one horse will be caused to work in a furrow, while the other three will be caused to work on the land or the stubble.

In the drawings accompanying and forming a part of this specification I illustrate one simple and convenient adaptation of the invention, which will be set forth in detail in the following description; but I do not limit myself to the precise disclosure thus made, for certain variations may be adopted within the scope of my claims succeeding said description.

Referring to the drawings, Figure 1 is a plan view of a four-horse draft-equalizer including my invention, showing the same associated with a portion of the beam of a sulky-plow. Fig. 2 is a detail in perspective hereinafter more particularly described.

Like characters refer to like parts in both the figures.

In the drawings I have shown the forward portion of the beam of a sulky-plow, the said beam being denoted by 5. Movably and directly connected with the beam in any desirable way is an evener-bar, as 6. By reason of the direct connection between the evener-bar and the beam I am enabled to get the horses as near as possible to the beam. It will be perceived that the bar is connected with the beam at a point between its ends, so as to present branches of unequal length, the effective portion of the longer branch, or that to the right, being practically three times as great as the effective portion of the other branch. In the present case, as will hereinafter appear, the draft of a single horse is applied at substantially the outer end of the long branch of the evener-bar, while the draft of three horses is applied substantially to the outer end of the short branch of said evener-bar, thereby equalizing the draft of the horses. In other words, each horse is caused to positively pull his share, the draft being applied directly to center of the beam.

To the outer end of the short branch of the evener-bar is movably connected the equalizer-bar 7, the connection being a pivotal one and being at a point about one-third of the length of said equalizer-bar. It will therefore be evident that the equalizer-bar presents long and short branches. To the outer end of the short branch of the evener-bar is movably connected between its ends, such as by a pivotal joint, the equalizer-bar 8. The connection between the equalizer-bars and between the latter and the evener-bar may be of the kind disclosed by my Letters Patent No. 732,465, granted June 30, 1903, to which reference may be had, or it may of any other suitable nature.

Connected to the outer end of the longer branch of the evener-bar 6 is a bracket 11, the shank of which has at its inner end a loop to clip said evener-bar and to be held rigidly in place by the pin or bolt 10, said bracket being preferably, like certain other similar brackets hereinafter described, made of steel, so as not to spring or give. The outer end of the bracket has a lateral projection, so that the whole structure is of approximately L or right-angular shape, and said lateral projection has a longitudinal row of perforations to interchangeably receive a pin, as 11', connected with the swingletree 12. From this it will be evident that said swingletree is adjustable longitudinally of the evener-bar 6. The distance between the point at which the bracket 11 is connected with the evener-bar 6 and the point at which said bar is connected with the beam 5 is about three times the distance between the point at which the bar 7 is connected to said evener-bar 6 and the beam 5, so that when the draft of one horse is applied to the long arm of the bar 6 it will balance the draft applied by three horses to the short arm of said bar 6. The horse that is hitched to the swingletree 12 walks in the open furrow, while the other three horses, hitched up as hereinafter described, walk on the stubble or land.

To the outer end of the long branch of the equalizer-bar 7, which branch is twice the length of the shorter one, is connected a bracket 14, exactly like the bracket hereinbefore described. The inner end of the equalizer-bar 8 is provided with a similar bracket 15. To these brackets 14 and 15 are adjustably connected whiffletrees, as 16 and 17, respectively. It will be evident that the three parts 12, 16, and 17 by reason of their mounting can be adjusted in the direction of the length of the evener-bar 6, this being for the purpose of getting the horses out of the way of the tongue or traces, so that they cannot be rubbed or chafed thereby.

To the outer end of the equalizer-bar 8 an arm, as 18, is connected in any desirable way, it carrying at its forward end in some suitable way the whiffletree 19, which, it will be seen, is longitudinally alined with the other whiffletrees, whereby the horses are maintained in line.

My evener is especially adapted for use in connection with sulky-plows, the draft of the four horses being applied directly to the center of the beam of the plow. The principal obstacle heretofore encountered in working four horses on a sulky-plow is the limited space in which they can work. By my invention this obstacle is wholly overcome, there is no possibility of the tugs chafing the horses, and the horses have plenty of room in which to work. It will be understood that by the position of parts the pull of the three horses on one side of the bar 6 equalizes the pull of the one horse on the opposite side of said bar and that the pull of the two horses equalizes the pull of the single horse applied to the bar 7 by reason of the mounting of the parts in the manner hereinbefore described.

Having thus described my invention, what I claim is—

1. A draft-equalizer comprising an evener-bar having means for direct connection with a plow-beam, a swingletree connected with the evener-bar at one side of said connection, an equalizer-bar jointed at about one-third of its length to said evener-bar and at the opposite side of said connection, the distances between the joint and connection and between the latter and the place at which the swingletree is connected with said evener-bar being of a ratio of substantially one to three, a second equalizer-bar connected to the short arm of the first equalizer-bar, means for connecting whiffletrees to the outer end of the long branch of said first-mentioned equalizer-bar, and means for connecting whiffletrees to the opposite ends of said second equalizer-bar.

2. A draft-equalizer involving an evener-bar, a bracket rigidly clipped to the evener-bar and provided at its forward end with a lateral extension having a row of longitudinal perforations for the adjustable connection therewith of a whiffletree.

3. A draft-equalizer involving an evener-bar arranged for connection with a plow-beam, a bracket clipped rigidly to said evener-bar at one side of said connection, provided at its lower end with a lateral extension having a row of perforations, an equalizer-bar pivoted to the said evener-bar at the opposite side of said connection, the distance between the pivot and said connection being substantially one-third of the distance between said connection and said bracket, a second equalizer-bar pivoted substantially centrally between its ends to the short branch of the first-mentioned equalizer-bar, an L-shaped bracket clipped to the long branch of the first equalizer-bar and having a row of perforations in its free branch, an L-shaped bracket clipped to the inner end of the second equalizer-bar and provided with a row of perforations, and an arm connected with the outer end of said equalizer-bar, the several brackets and arm being arranged for the connection therewith of whiffletrees.

In testimony whereof I have hereunto set my hand in presence of two subscribing witnesses.

FRANKLIN B. STOUT.

Witnesses:
 LOUIS WALL,
 L. C. MARHISON.